No. 767,386. PATENTED AUG. 16, 1904.
C. CANCLINI.
POTATO SLICER.
APPLICATION FILED SEPT. 23, 1903.
NO MODEL.
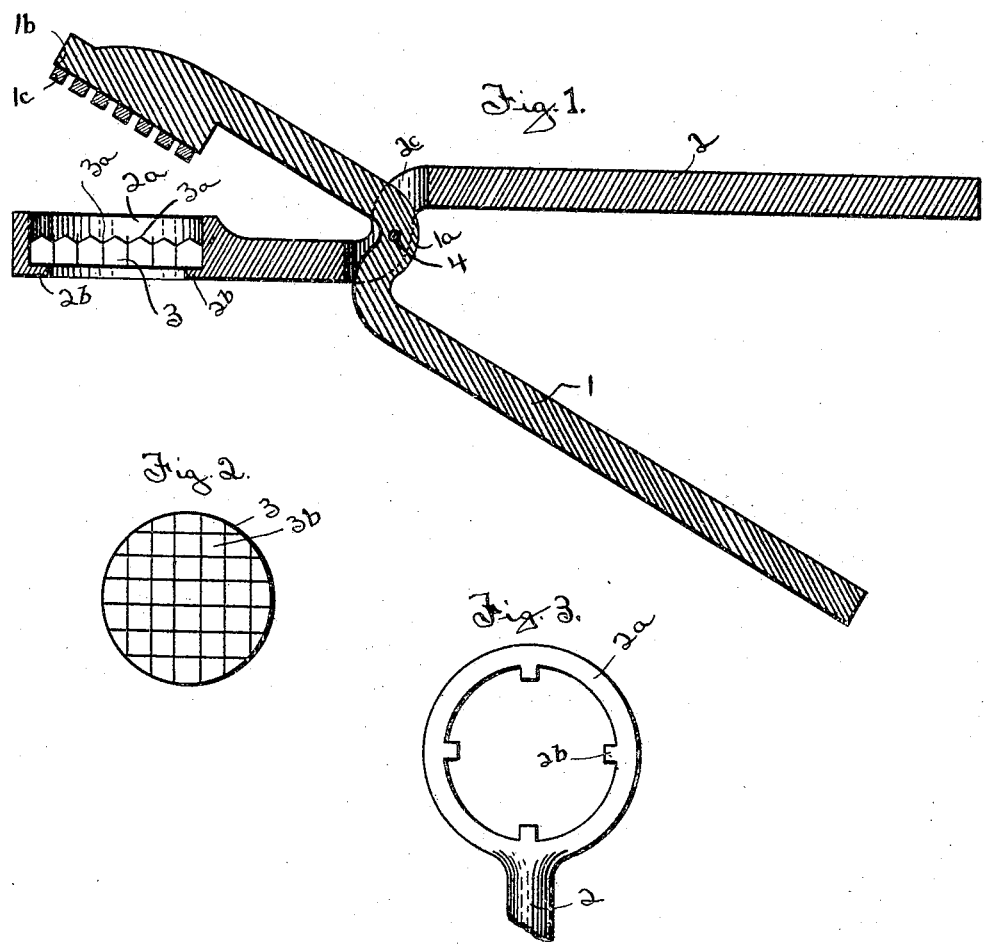
Witnesses
Percy S. Webster.
Stella Anderson.
Inventor
Charles Canclini
By Joshua B. Webster
Attorney No. 767,386.

Patented August 16, 1904.

UNITED STATES PATENT OFFICE.

CHARLES CANCLINI, OF SONORA, CALIFORNIA.

POTATO-SLICER.

SPECIFICATION forming part of Letters Patent No. 767,386, dated August 16, 1904.

Application filed September 23, 1903. Serial No. 174,346. (No model.)

*To all whom it may concern:*

Be it known that I, CHARLES CANCLINI, a citizen of the United States, residing at Sonora, in the county of Tuolumne, State of California, have invented certain new and useful Improvements in Potato-Slicers; and I do declare the following to be a full, clear, and exact description of the invention, such as will enable others skilled in the art to which it appertains to make and use the same, reference being had to the accompanying drawings, and figures of reference marked thereon, which form a part of this specification.

My invention relates to certain improvements in potato-slicers, the object being to produce a slicer which will cut the potato into uniform slices, so that when they are cooked they will cook evenly. This I accomplish by use of a pincers-like implement, one head of which is ring-shaped and contains a suitable cutting mechanism, the other head being solid and suitably constructed for forcing the potato through the ring, and such other devices and combination of devices as will be more fully set forth in the following specification, and pointed out in the claim hereunto annexed, reference being had to the accompanying drawings for a better understanding thereof, in which—

Figure 1 is a side elevation of my improved potato-slicer in section, showing the arms extended. Fig. 2 is a bottom plan view of my removable fractional cutter, showing apertures therein. Fig. 3 is a bottom plan detached view of the ring for the reception of the cutter.

Similar numerals of reference indicate corresponding parts of the several views.

1 is one handle of my improved potato-slicer. $1^a$ is a curved angle in same for the purpose as will be shown.

$1^b$ designates the head of the handle 1. $1^c$ represents teeth on same.

2 is the other handle.

$2^a$ is a ring at the head of the handle 2. $2^b$ represents projecting lugs in same.

$2^c$ is a slot in the handle 2.

3 is a removable cutter which is formed of two series of spaced-apart blades, the blades of one series intersecting those of the other series at approximately right angles.

$3^a$ represents angle-points on the portions intermediate their points of intersection.

$3^b$ represents apertures between the blades of the cutter.

4 is a pin for joining the handles 1 and 2 and their parts together and on which they turn.

The mode of operating my improved potato-slicer is as follows: The cutter 3 is placed in the ring $2^a$ and rests on the projecting lugs $2^b$, and then the potato to be sliced is placed thereon. The operator grasps the handles 1 and 2 and presses them together. This brings the head $1^a$ in contact with the potato and forces it through the apertures $3^b$ in the cutter 3. This cuts the potato into parts of uniform thickness.

The teeth $1^c$ fit into the apertures $3^b$, so as to dislodge any particles of potato that might remain therein.

The apertures in the cutter may be of any suitable shape or size.

The angle-points $3^a$ are for the purpose of more readily cutting the potato. The handles 1 and 2 are both curved upwardly and downwardly, respectively, on opposite sides of the pivot, so as to provide a space between the handles whereby the operator will not pinch his fingers.

I have entered into a detailed description and relative arrangement of parts embraced in the present and preferred embodiment of my invention in order to impart a full, clear, and exact understanding of the same. I do not desire, however, to be understood as confining myself to such specific construction and arrangement of parts, as such changes and modifications may be made in practice as fairly fall within the scope of my claim.

It will be observed that the lugs $2^b$ are so disposed as to have their lower faces flush with the under side of the ring $2^a$, and the cutter 3, which rests on said lugs, does not project into the upper portion of said ring. This disposition of the cutter permits the upper portion of the interior of the ring to act as a guide for the potatoes.

Having thus described my invention, what I claim as new, and wish to secure by Letters Patent, is—

A potato-slicer comprising two members projecting one through the other and being pivoted together at such point said members being curved upwardly and downwardly respectively on opposite sides of their pivoted connection, whereby the opposite end portions of said members are spaced apart, a ring formed integral with one end of one of said members, a toothed head formed integral with the adjacent end of the other member, lugs formed integral with the interior of said ring and having their lower faces flush with the under side of said ring, and a cutter arranged in the lower portion of said ring and resting on said lugs, substantially as and for the purpose specified.

In testimony whereof I affix my signature in presence of two witnesses.

CHARLES CANCLINI.

Witnesses:
  PERCY S. WEBSTER,
  JOSHUA B. WEBSTER.